US012330913B2

(12) United States Patent
Rasanen et al.

(10) Patent No.: US 12,330,913 B2
(45) Date of Patent: Jun. 17, 2025

(54) METHOD OF CONSTRUCTING ELEVATOR AND CONSTRUCTION-TIME ELEVATOR ARRANGEMENT

(71) Applicant: Kone Corporation, Helsinki (FI)

(72) Inventors: Matti Rasanen, Helsinki (FI); Markku Haapaniemi, Helsinki (FI); Otto Lanz, Helsinki (FI); Janne Laine, Helsinki (FI); Aki Haikonen, Helsinki (FI); Jorma Mustalahti, Helsinki (FI); Sakari Korvenranta, Helsinki (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 18/464,534

(22) Filed: Sep. 11, 2023

(65) Prior Publication Data

US 2023/0416055 A1 Dec. 28, 2023

Related U.S. Application Data

(63) Continuation of application No. PCT/EP2021/057143, filed on Mar. 19, 2021.

(51) Int. Cl.
*B66B 19/02* (2006.01)
*B66B 19/04* (2006.01)

(52) U.S. Cl.
CPC .............. *B66B 19/02* (2013.01); *B66B 19/04* (2013.01)

(58) Field of Classification Search
CPC .......... B66B 19/02; B66B 19/04; B66B 19/00
See application file for complete search history.

(56) References Cited

U.S. PATENT DOCUMENTS 5,957,243 A * 9/1999 Root ........................ B66B 11/00 187/266
7,635,049 B2 * 12/2009 Van Der Meijden ........................ B66B 19/002 187/401

(Continued)

FOREIGN PATENT DOCUMENTS

JP 2001322778 A 11/2001
WO WO-2012/084519 A1 6/2012

OTHER PUBLICATIONS

International Search Report and Written Opinion of the International Searching Authority for International Application No. PCT/EP2021/057143 dated Nov. 15, 2021.

*Primary Examiner* — Michael A Riegelman
(74) *Attorney, Agent, or Firm* — Harness, Dickey & Pierce, P.L.C.

(57) ABSTRACT

The invention relates to a method of constructing an elevator comprising providing an elevator car in a hoistway, said elevator car comprising a cabin frame, and a temporary pulley beam detachably mounted on the cabin frame; mounting a hoisting machine in a first position which first position is at a first vertical level in the hoistway; suspending (first suspending) the elevator car with a hoisting roping from the hoisting machine via said temporary pulley beam; moving the elevator car in the hoistway with the hoisting machine while it is in said first position and suspended by the roping via said temporary pulley beam; mounting a hoisting machine in a second position which second position is at a second higher vertical level inside a machine room located above the hoistway; removing the temporary pulley beam from the elevator car, comprising detaching the temporary pulley beam from the cabin frame; suspending the car with a hoisting roping from the hoisting machine mounted in said second position via said cabin frame without said temporary (Continued)

pulley beam; moving the elevator car in the hoistway with the hoisting machine while it is in said second position and the car is suspended via said cabin frame without said temporary pulley beam. The invention also relates to an elevator arrangement for implementing the method.

8 Claims, 9 Drawing Sheets

(56) References Cited

U.S. PATENT DOCUMENTS

| | | | | |
|---|---|---|---|---|
| 8,172,041 | B2 * | 5/2012 | Kawasaki | B66B 11/0045 187/254 |
| 8,205,720 | B2 * | 6/2012 | Barneman | B66B 19/02 187/266 |
| 8,291,568 | B2 * | 10/2012 | Barneman | B66B 19/00 29/431 |
| 8,827,045 | B2 * | 9/2014 | Girgis | B66B 7/085 187/411 |
| 11,208,296 | B2 * | 12/2021 | Christen | B66B 19/002 |
| 11,414,303 | B2 * | 8/2022 | Haapaniemi | B66B 19/007 |
| 2009/0260926 | A1 * | 10/2009 | Van Der Meijden | B66B 19/02 187/350 |
| 2010/0018809 | A1 * | 1/2010 | Peacock | B66B 5/005 187/351 |
| 2010/0133048 | A1 * | 6/2010 | Barneman | B66B 19/00 187/414 |
| 2012/0160615 | A1 * | 6/2012 | Girgis | B66B 19/007 187/411 |
| 2012/0291395 | A1 * | 11/2012 | Plathin | B66B 19/02 52/741.1 |
| 2015/0307322 | A1 * | 10/2015 | Peacock | B66B 7/064 187/254 |
| 2016/0152442 | A1 * | 6/2016 | Weber | B66B 19/005 187/359 |
| 2017/0166419 | A1 * | 6/2017 | Rasanen | B66B 19/005 |
| 2018/0290863 | A1 * | 10/2018 | Peacock | E04G 3/32 |
| 2020/0277158 | A1 * | 9/2020 | Christen | B66B 5/284 |
| 2021/0245997 | A1 * | 8/2021 | Rasanen | B66B 9/02 |
| 2021/0245998 | A1 * | 8/2021 | Lanz | B66B 19/00 |
| 2021/0331898 | A1 * | 10/2021 | Haapaniemi | B66B 19/007 |
| 2022/0297978 | A1 * | 9/2022 | Räsänen | B66B 7/024 |
| 2023/0312307 | A1 * | 10/2023 | Lanz | B66B 11/043 187/414 |
| 2023/0339727 | A1 * | 10/2023 | Bizzozero | B66B 19/04 |
| 2023/0416055 | A1 * | 12/2023 | Rasanen | B66B 19/02 |
| 2024/0182268 | A1 * | 6/2024 | Lanz | B66B 11/0206 |

* cited by examiner

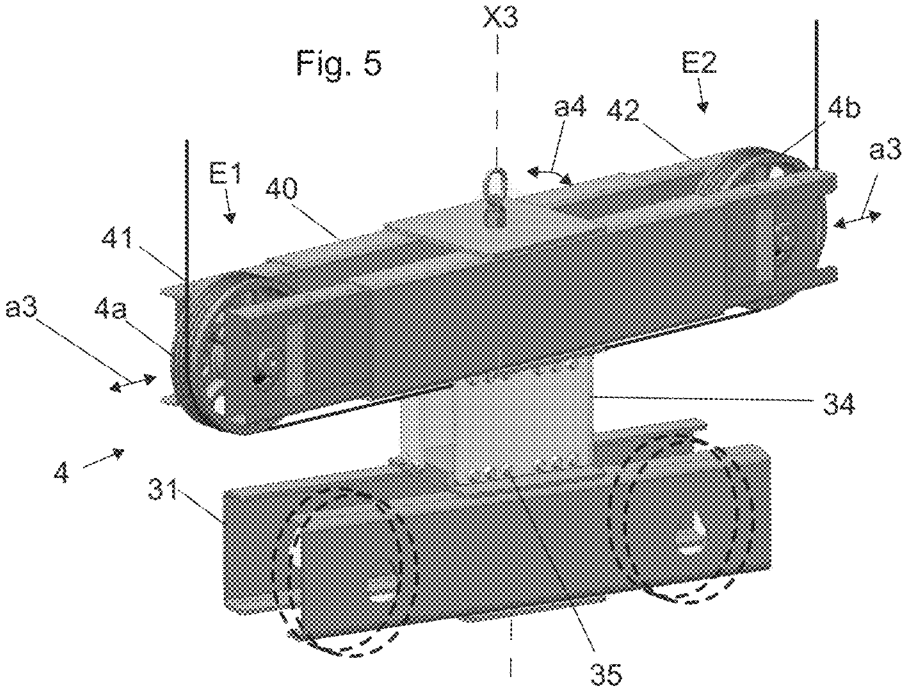
Fig. 5
Fig. 6
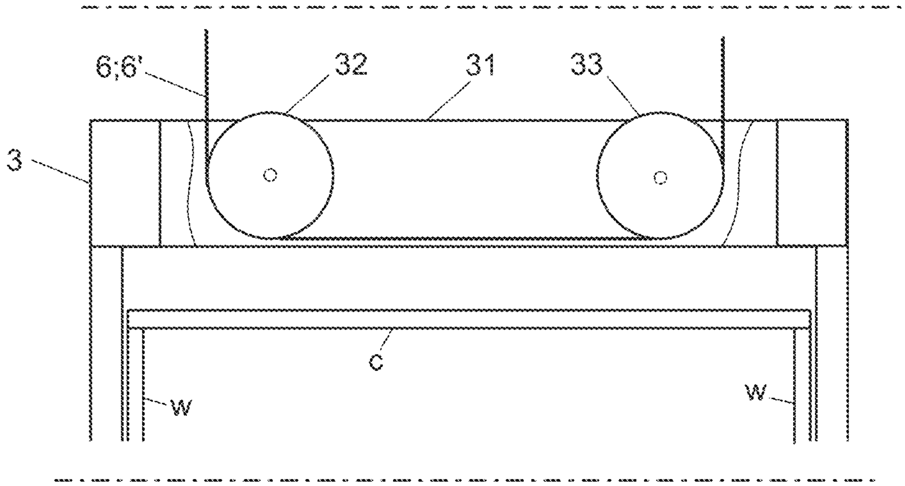
Fig. 7
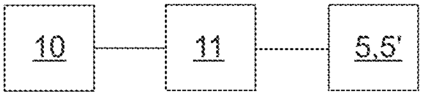

METHOD OF CONSTRUCTING ELEVATOR AND CONSTRUCTION-TIME ELEVATOR ARRANGEMENT

CROSS-REFERENCE TO RELATED APPLICATION

This application is a continuation of PCT International Application No. PCT/EP2021/057143 which has an International filing date of Mar. 19, 2021, the entire contents of which are incorporated herein by reference.

FIELD OF THE INVENTION

The invention relates to a method of constructing an elevator and a construction-time elevator arrangement. The elevator is preferably an elevator for transporting passengers and/or goods.

BACKGROUND OF THE INVENTION

In connection with so-called jump-lifts, the bottom part of an elevator hoistway is taken into use before the building has been completed. In this case the upper parts of the building as well as the top part of the elevator hoistway can be constructed at the same time as an elevator moving in the bottom part of the elevator hoistway already serves people on the lower floors of the building under construction. In a jump-lift the elevator car moving in the lower parts of the elevator hoistway is suspended and moved during construction-time use with a hoisting machine mounted in the hoistway. When the elevator hoistway under construction above the vertically hoisting machine has reached a sufficient stage of completion, the completed part of the elevator hoistway can be taken into use. At this stage a "jump" is performed, wherein the hoisting machine is hoisted higher. Thereafter, the car can reach a higher position than before the jump and start to serve additional floors.

It is known, that the hoisting machine can be mounted in the hoistway in various ways, such as via a machine room which is vertically movable in the elevator hoistway. The machine room can be mountable in different vertical positions e.g. by releasable mounting means (e.g. claws or grippers) actuatable to disengage from a counterpart bearing structure so as to allow hoisting of the machine room when desired. When a jump is to be made, the hoisting machine can be hoisted together with the machine room resting supported by it. Alternatively, the hoisting machine can be mounted in the hoistway without a machine room, in which case it can be mounted for example on one or more guide rails or a guide rail bracket or practically on any suitable bearing structure provided in or fixed on the hoistway. When a jump is to be made, the hoisting machine can be hoisted to be mounted to a higher position e.g. by a hoist supported above the hoisting machine.

In prior art, a drawback has been that the component positions during construction phase and in the final elevator have not been easy to optimize. When the intention is to construct a final elevator having a machine room utilizing a jump-lift method where the hoisting machine position is changed to be higher during the method, the optimal position of the hoisting machine of the final elevator or the roping thereof might be different (in horizontal direction) than their optimal positions during an earlier phase of the method when the hoisting machine is mounted inside the hoistway. In the final elevator the position of a hoisting machine inside a machine room of the final elevator as well as rope routing can be more freely chosen than during construction time.

For example, in solutions where the hoisting machine is to be mounted during jump-phase in a machineroomless manner directly on a stationary structure of the hoistway such as guide rail, the hoisting machine position is strongly affected by position of the stationary structure in question, e.g. said guide rail. In the final elevator, such restrictions are not present in the same extent, and thus component positions need not be maintained.

For example, in solutions utilizing a movable machine room, the hoisting machine position is strongly affected by balance requirements of the machine room. Typically, uneven load distribution might make the machine room unstable or difficult to handle and mount. In the final elevator, the restrictions set by balance requirements are not present in the same extent, and thus component positions need not be maintained.

BRIEF DESCRIPTION OF THE INVENTION

The object of the invention is to introduce an improved method of constructing an elevator and an improved construction-time elevator arrangement. An object is particularly to introduce a solution whereby one or more of the above defined problems of prior art and/or drawbacks discussed or implied elsewhere in the description can be alleviated. An object is particularly to introduce a solution which facilitates optimizing component positions during phases having different requirements.

An object is particularly to provide a solution by which an elevator with machine room can be constructed effectively while being able to take parts of the elevator into use already when the whole height of a hoistway and/or the machine room are not yet ready to be used.

Embodiments are introduced where a construction time elevator arrangement is quickly convertible into final elevator even when the positions of the hoisting machine and/or roping of the final elevator differ from those of the arrangement used during construction time.

Embodiments are introduced where hoisting machine and roping can be positioned such during construction time that they are optimal yet without making slow or difficult to convert the construction time elevator arrangement into the final elevator.

It is brought forward a new method of constructing an elevator comprising providing an elevator car (1; 51) in a hoistway, said elevator car comprising a cabin frame, and a temporary pulley beam assembly detachably mounted on the cabin frame;

- mounting (first mounting) a hoisting machine in a first position (I) which first position (I) is at a first vertical level in the hoistway;
- suspending (first suspending) the elevator car with a hoisting roping from the hoisting machine via said temporary pulley beam assembly;
- moving (first moving) the elevator car in the hoistway with the hoisting machine while it is in said first position (I) and suspended by the roping via said temporary pulley beam assembly;
- mounting (second mounting) a hoisting machine in a second position (II) which second position (II) is at a second higher vertical level inside a machine room located above the hoistway;
- removing the temporary pulley beam assembly from the elevator car, comprising detaching the temporary pulley beam assembly from the cabin frame;

suspending (second suspending) the car with a hoisting roping from the hoisting machine mounted in said second position (II) via said cabin frame (3; 53) without said temporary pulley beam assembly;

moving (second moving) the elevator car) in the hoistway with the hoisting machine while it is in said second position (II) and the car is suspended via said cabin frame without said temporary pulley beam assembly.

With this kind of solution one or more of the above mentioned objects can be achieved.

Preferable further details of the method are introduced in the following, which further details can be combined with the method individually or in any combination.

In a preferred embodiment, the cabin frame of the elevator car provided in said providing carries panels delimiting a cabin interior, said panels preferably including one or more wall panels and/or a floor panel, and/or a ceiling panel, preferably all of these. The cabin frame of the elevator car provided in said providing preferably moreover carries one or more door panels delimiting said cabin interior. The interior is particularly suitable for accommodating one or more passengers to be transported with the car and/or goods to be transported with the elevator car.

In a preferred embodiment, the cabin frame of the elevator car carries one or more of (however preferably all) the aforementioned panels (wall panels, floor panel, ceiling panel) and/or said one or more door panels also during said second moving. Thereby, the car structure is relatively close to its final structure already during said first using.

In a preferred embodiment, the hoisting machine mounted in the first position (I) comprises a drive wheel for driving a roping suspending the elevator car, and the hoisting machine mounted in second position (II) comprises a drive wheel for driving a roping suspending the elevator car, and the rotation axis of the hoisting machine mounted in the first position (I) and the rotation axis of the hoisting machine mounted in the second position (II) are non-parallel.

In a preferred embodiment, the hoisting machine mounted in the first position (I) comprises a drive wheel for driving a roping suspending the elevator car, and the hoisting machine mounted in second position (II) comprises a drive wheel for driving a roping suspending the elevator car, and the vertical silhouettes of the drive wheel of the hoisting machine mounted in first position (I) and the drive wheel of the hoisting machine mounted in the second position (II) do not coincide.

In a preferred embodiment, the centre of gravity of the hoisting machine mounted in first position (I), and the centre of gravity of the hoisting machine mounted in the first position (I) are horizontally displaced, in particular more than 20 cm.

In a preferred embodiment, the temporary pulley beam assembly detachably mounted on the cabin frame is fixed to the cabin frame with releasable fixing means. The releasable fixing means may comprise one or more screwable fixing members, such as one or more bolts, for example. Preferably then, the detaching the temporary pulley beam assembly from the cabin frame comprises releasing the releasable fixing means.

In a preferred embodiment, the cabin frame comprises a horizontal beam, and the temporary pulley beam assembly is detachably mounted on the horizontal beam of the cabin frame.

In a preferred embodiment, the temporary pulley beam assembly comprises a beam body, which is preferably at an angle (i.e. non-parallel) relative to the horizontal beam of the cabin frame during said first moving.

In a preferred embodiment, the cabin frame comprises a horizontal beam, and the temporary pulley beam assembly comprises a beam body, and the temporary pulley beam assembly is detachably mounted on the horizontal beam of the cabin frame.

In a preferred embodiment, the temporary pulley beam assembly comprises a beam body and the angle between the beam body of the temporary pulley beam assembly and the cabin frame, in particular a horizontal beam thereof, is adjustable, and the method comprises before said first suspending adjusting said angle, said adjusting preferably being performed when the temporary pulley beam assembly is inside the hoistway.

In a preferred embodiment, the temporary pulley beam assembly comprises a beam structure and a first pulley and a second pulley, and the first suspending comprises arranging the hoisting roping to pass around said first pulley and said second pulley.

In a preferred embodiment, the beam structure is elongated having a first end and a second end, and the temporary pulley beam assembly comprises at said first end a first pulley and at said second end a second pulley, and the first suspending comprises arranging the hoisting roping to pass around said first pulley and said second pulley.

In a preferred embodiment, the temporary pulley beam assembly comprises a mounting structure.

In a preferred embodiment, the temporary pulley beam assembly is detachably mounted on a horizontal beam of the cabin frame via a mounting structure detachably attached on the horizontal beam of the cabin frame. The mounting structure is preferably fixed to the horizontal beam of the cabin frame with releasable fixing means. These then enable detaching of the mounting structure from the cabin frame. Thus, the detaching the temporary pulley beam assembly from the cabin frame preferably comprises releasing said releasable fixing means. The releasable fixing means may comprise one or more screwable fixing members, such as one or more bolts, for example.

In a preferred embodiment, the horizontal distance between said first and second pulley is adjustable, and the method comprises before said first suspending adjusting the horizontal distance between said first and second pulley. This is preferably performed when the temporary pulley beam assembly is inside the hoistway.

In a preferred embodiment, said second suspending comprises arranging a hoisting roping to pass around one or more pulleys, preferably a third pulley and a fourth pulley, mounted on the cabin frame, preferably on a horizontal beam thereof. This horizontal beam is preferably the horizontal beam referred to above.

In a preferred embodiment, at the time of said first moving the car comprises one or more pulleys (preferably the one or more pulleys mentioned in the previous paragraph, i.e. preferably a third pulley and a fourth pulley), mounted on the cabin frame, preferably on a horizontal beam thereof, around which one or more pulleys the hoisting roping, nor any other roping does not (yet) pass. The one or more pulleys being thus early present provides that the car can be assembled already at an early stage relatively well ready for use in the final elevator.

In a preferred embodiment, said first moving comprises controlling by an elevator control the hoisting machine mounted in the first position (I), in particular rotation of a motor of the hoisting machine connected to a drive wheel of the hoisting machine around which drive wheel the roping passes, in response to signals received from one or more user interfaces, while the hoisting machine is mounted in the first position (I).

In a preferred embodiment, said second moving comprises controlling by an elevator control the hoisting machine mounted in the second position (I), in particular rotation of a motor of the hoisting machine connected to a drive wheel of the hoisting machine around which drive wheel the roping passes, in response to signals received from one or more user interfaces, while the hoisting machine is mounted in the second position (II).

In a preferred embodiment, the method comprises between said first moving and said second mounting at least one sequence (jump sequence) comprising hoisting the hoisting machine higher in the hoistway to an intermediate position, which intermediate position is at a vertical level which is vertically between said first and second position (I, II); and thereafter mounting the hoisting machine in said intermediate position (im); and following said sequence moving (intermediate moving) the elevator car in the hoistway with the hoisting machine while it is in said intermediate position and suspended by the roping via said temporary pulley beam.

In a preferred embodiment, in said jump sequence the hoisting is performed with a hoisting arrangement. The hoisting arrangement can comprise a support structure mounted in the hoistway, and a hoist supported by the support structure.

In a preferred embodiment, the method comprises during said jump sequence supplying an additional length of said hoisting roping from a rope supply storage to which the hoisting roping passes. Said supplying preferably comprises moving an additional length of said hoisting roping through an openable rope clamp from the rope supply storage e.g. by pulling hoisting roping. Said pulling preferably is produced at least partly by hoisting of the hoisting machine.

In a preferred embodiment, in said first mounting and/or in said intermediate mounting, which are referred anywhere above, the hoisting machine is mounted on a vertically oriented guide rail for guiding the elevator car and/or a vertically oriented guide rail for guiding counterweight.

In a preferred embodiment, in said first mounting and/or in said intermediate mounting, the hoisting machine is mounted via a movable platform. The movable platform is preferably comprised in a temporary machine room movable vertically in the hoistway.

In a preferred embodiment, the hoisting machine mounted in said second position (I) is the same as or different than the hoisting machine mounted in said first position (I).

In a preferred embodiment, said hoisting roping with which the elevator car is suspended in said second suspending is the same as or different than the hoisting roping with which the elevator car is suspended in said first suspending.

Preferred details of the method are also introduced in the following chapters describing the arrangement, which further details can be combined with the method individually or in any combination.

It is also brought forward a new construction-time elevator arrangement, comprising an elevator car in a hoistway, said elevator car comprising a cabin frame, and a temporary pulley beam assembly detachably mounted on the cabin frame;

- a hoisting machine mounted in a first position (I) which first position (I) is at a first vertical level in the hoistway;
- a hoisting roping;
- wherein the elevator car is suspended with the hoisting roping from the hoisting machine via said temporary pulley beam.

With this kind of solution one or more of the above-mentioned objects can be achieved.

Preferable further details of the arrangement are introduced in the following, which further details can be combined with the arrangement individually or in any combination.

In a preferred embodiment, the arrangement comprises a hoisting arrangement for hoisting (at least) the hoisting machine higher in the hoistway.

In a preferred embodiment, the arrangement comprises a rope supply storage to which the hoisting roping passes. The hoisting roping passes preferably to said rope supply storage through an openable rope clamp. Preferably, the hoisting roping passes in particular from a fixing to one of said car and counterweight and therefrom over a drive wheel of the hoisting machine and therefrom to the other of said car and counterweight and therefrom to an openable rope clamp and therefrom to the rope supply storage.

In a preferred embodiment, the elevator car is movable in the hoistway with the hoisting machine while it is in said first position (I) and suspended by the roping via said temporary pulley beam.

In a preferred embodiment, the arrangement comprises an elevator control configured to control the hoisting machine, in particular rotation of a motor of the hoisting machine connected to a drive wheel of the hoisting machine around which drive wheel the roping passes, in response to signals received from one or more user interfaces, while the hoisting machine is mounted in the first position (I).

In a preferred embodiment, the arrangement comprises a machine room located above the hoistway, which may be still under construction.

In a preferred embodiment, the machine room comprises a floor comprising one or more holes extending through it in vertical direction.

In a preferred embodiment, the machine room comprises a mounting pedestal on which a hoisting machine is mountable in a second position (II).

In a preferred embodiment, the beam structure is elongated having a first end and a second end, and the temporary pulley beam assembly comprises at said first end a first pulley and at said second end a second pulley, and the hoisting roping passes around said first pulley and said second pulley.

In a preferred embodiment, the horizontal distance between said first and second pulley is adjustable.

In a preferred embodiment, the temporary pulley beam, in particular a beams structure thereof, comprises an elongated beam body.

In a preferred embodiment, the temporary pulley beam assembly comprises mounted on the elongated beam body a first end member on which the first pulley is mounted, and a second end member on which the second pulley is mounted.

In a preferred embodiment, the first end member and the second end member are connected to the beam body telescopically movably, and the first end member and the second end member are lockable to be immovable relative to the beam body.

In a preferred embodiment, the cabin frame comprises a horizontal beam, and the temporary pulley beam assembly is detachably mounted on the horizontal beam of the cabin frame.

In a preferred embodiment, the arrangement comprises one or more pulleys, preferably a third pulley and a fourth pulley, mounted on the cabin frame, preferably on a horizontal beam thereof, around which one or more pulleys the hoisting roping nor any other roping does not (yet) pass.

In a preferred embodiment, the temporary pulley beam assembly is at an angle (i.e. non-parallel) relative to the horizontal beam of the cabin frame.

In a preferred embodiment, the mounting structure comprises pivotable and lockable mounting means between the beam body and a horizontal beam of the cabin frame.

In a preferred embodiment, the pivotable and lockable mounting means comprise a lower support member and an upper support member, which support members can be pivoted relative to each other around a vertical axis into multiple different relative positions when the pivotable and lockable mounting means are in unlocked state. The support members are, in particular, placed on top of each other.

In a preferred embodiment, each support member comprises plurality holes positioned such that the support members can be pivoted relative to each other around a vertical axis into multiple different relative positions such that holes of the support members coincide, and can be locked together by inserting a bolt into coinciding holes.

In a preferred embodiment, one of the support members carries the beam body, the other of the support members is in fixed connection with the frame of the car, such as the horizontal beam thereof.

In a preferred embodiment, the temporary pulley beam assembly is detachably mounted on a horizontal beam of the cabin frame via a mounting structure detachably attached on the horizontal beam of the cabin frame. The mounting structure is preferably fixed to the horizontal beam of the cabin frame with releasable fixing means. These then enable detaching of the mounting structure from the cabin frame. The releasable fixing means may comprise one or more screwable fixing members, such as one or more bolts, for example.

In a preferred embodiment, the mounting structure comprises a pedestal positioned vertically between a beam body of the temporary pulley beam assembly and the horizontal beam and, in particular such that the horizontal beam and the beam body are a vertical distance, preferably more than 10 cm, apart. This facilitates that the beam body of the temporary pulley beam assembly and the horizontal beam can be simply arranged at an angle without the hoisting roping contacting in use a beam. The pedestal preferably comprises a opening extending through it horizontally and in direction parallel with the longitudinal direction of the beam body and the roping passes through said opening between the pulleys.

In a preferred embodiment, the mounting structure is detachably attached on the cabin frame, preferably on a horizontal beam thereof.

In a preferred embodiment of a first kind, the temporary pulley beam assembly is above the cabin interior of the car. Then preferably, the temporary pulley beam assembly is mounted detachably on a horizontal beam of the cabin frame, which extends above the cabin interior of the car. Then preferably, the temporary pulley beam assembly is mounted detachably on the horizontal beam of the cabin frame above the horizontal beam.

In a preferred embodiment of a second kind, the temporary pulley beam assembly is below the cabin interior of the car. Then preferably, the temporary pulley beam assembly is mounted detachably on a horizontal beam of the cabin frame, which extends below the cabin interior of the car. Then preferably, the temporary pulley beam assembly is mounted detachably on the horizontal beam of the cabin frame below the horizontal beam.

In a preferred embodiment, the hoisting machine is mounted in said first position via a movable platform. The movable platform is preferably comprised in a temporary machine room movable vertically in the hoistway. Preferably, in each hoisting the hoisting machine higher in the hoistway to an intermediate position (im) the hoisting machine is hoisted together with the platform resting supported by the platform.

In a preferred embodiment, the hoisting machine is mounted in said first position (I) on a vertically oriented guide rail for guiding the elevator car and/or a vertically oriented guide rail for guiding counterweight.

In a preferred embodiment, each said hoisting roping comprises one or more ropes.

BRIEF DESCRIPTION OF THE DRAWINGS

In the following, the present invention will be described in more detail by way of example and with reference to the attached drawings, in which

FIG. 5 illustrates a preferred structure of the temporary pulley beam assembly detachably mounted on a beam of the cabin frame.

FIG. 6 illustrates a preferred configuration of car suspension when the hoisting machine is in its second position.

FIG. 7 illustrates a user interface, an elevator control and a hoisting machine and their preferred connections.

The foregoing aspects, features and advantages of the invention will be apparent from the drawings and the detailed description related thereto.

DETAILED DESCRIPTION

Figure 1:
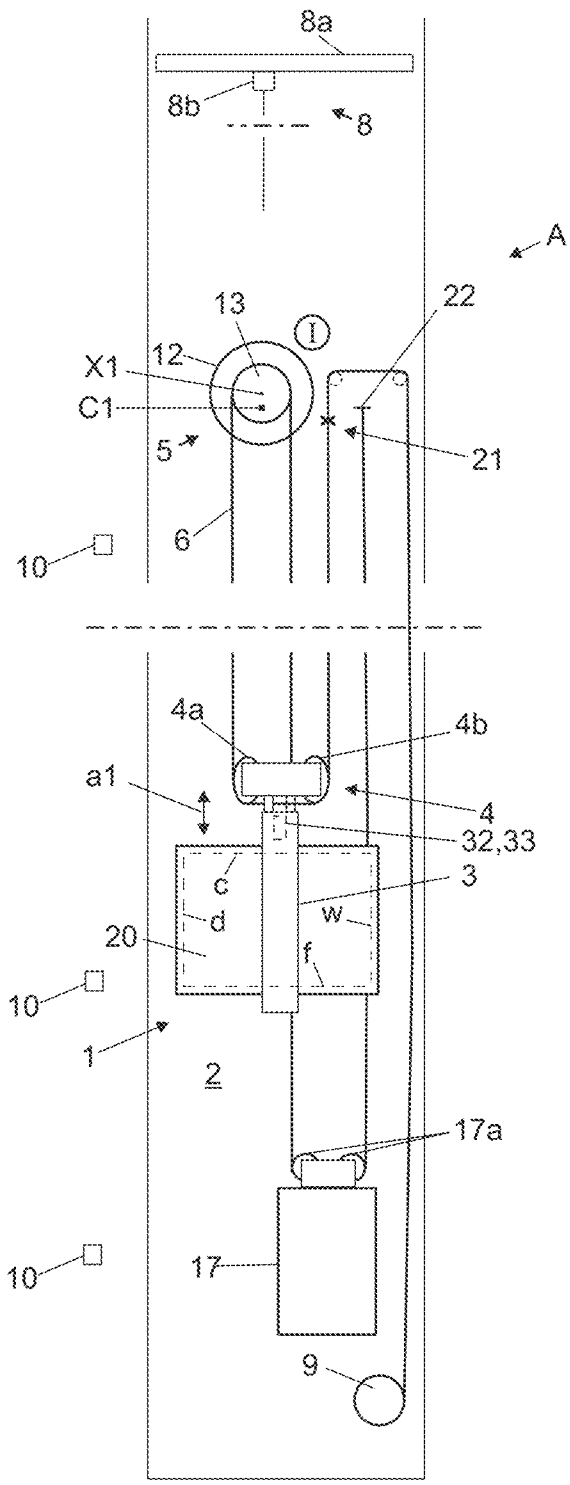
FIG. 1 illustrates schematically a front view of an elevator arrangement of a first kind in a phase of a method for constructing an elevator according to an embodiment where a hoisting machine is in a first position.
Figure 9:
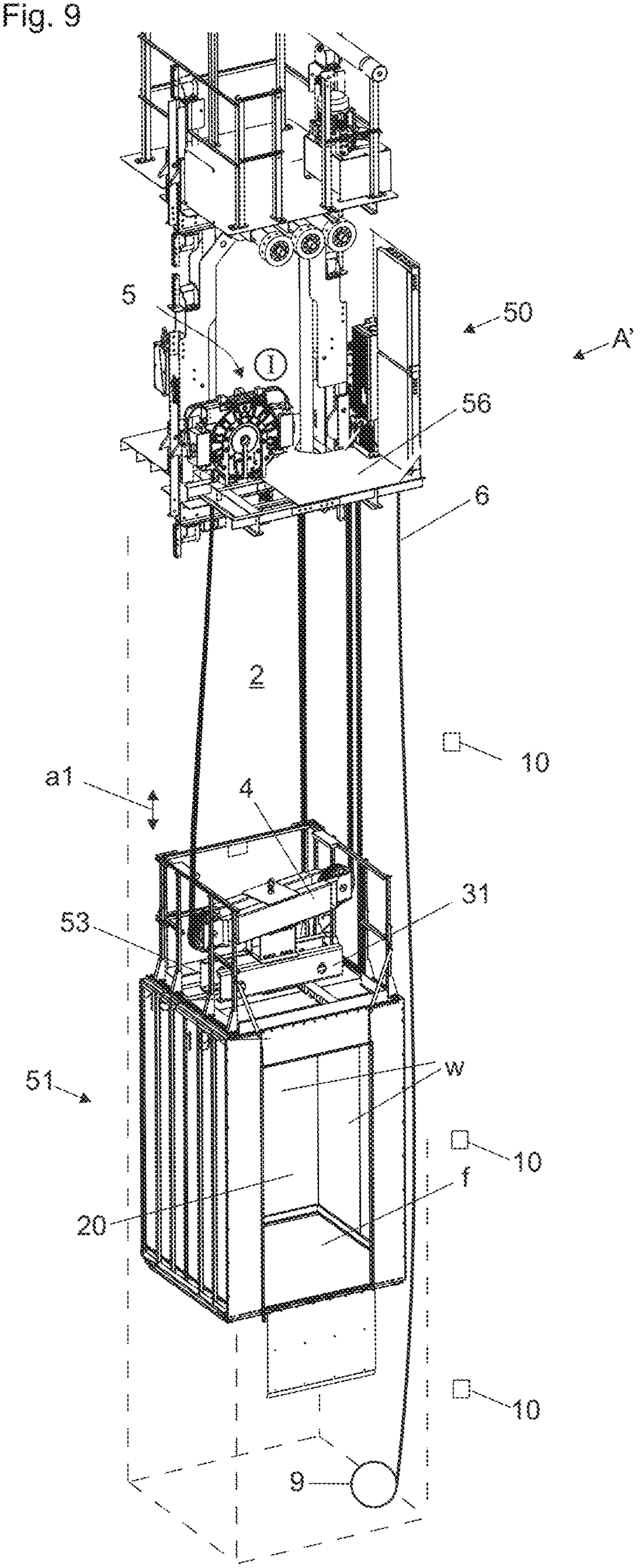
FIG. 9 illustrates schematically a front view of an elevator arrangement of a second kind in a phase of a method for constructing an elevator according to an embodiment where a hoisting machine is in a first position.

FIG. 1 illustrates a construction-time elevator arrangement A in a phase of a method for constructing an elevator according to an embodiment of a first kind, and FIG. 9 illustrates a construction-time elevator arrangement A' in a phase of a method for constructing an elevator according to an embodiment of a second kind.

Referring to FIGS. 1 and 9, the method comprises providing an elevator car 1; 51 in a hoistway 2, said elevator car 1; 51 comprising a cabin frame 3; 53, and a temporary pulley beam assembly 4 detachably mounted on the cabin frame 3; 53, and mounting (first mounting) a hoisting machine 5 in a first position I which first position I is at a first vertical level in the hoistway 2. The cabin frame 3; 53 provided in said providing carries panels delimiting a cabin interior 20, said panels preferably including wall panels w, floor panel f, ceiling panel c. The cabin frame 3; 53 preferably moreover carries one or more door panels d (not shown in all Figures) delimiting said cabin interior 20. The method furthermore comprises suspending (first suspending) the elevator car 1; 51 with a hoisting roping 6 from the hoisting machine 5 via said temporary pulley beam assembly 4. The method furthermore comprises, in particular after performing said first suspending, moving (first moving) the elevator car 1; 51 in the hoistway 2 with the hoisting machine 5 while it is in said first position I and suspended by the roping 6 via said temporary pulley beam assembly 4. Said first moving is illustrated in FIGS. 1 and 9 by arrow a1.

Figure 4:
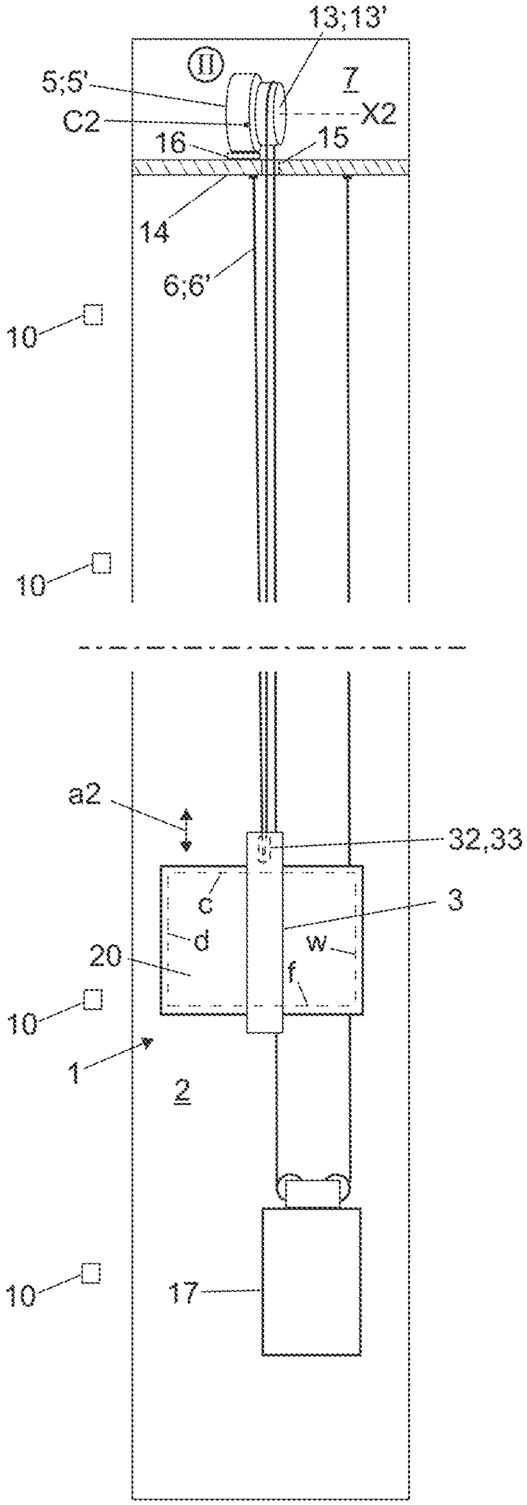
FIG. 4 illustrates a phase of the method where the hoisting machine is in a second position.

Referring to FIG. 4, the method furthermore comprises mounting (second mounting) a hoisting machine 5; 5' in a second position II which second position II is at a second higher vertical level inside a machine room 7 located above the hoistway 2, and removing the temporary pulley beam assembly 4 from the elevator car 1; 51, said removing comprising detaching the temporary pulley beam assembly 4 from the cabin frame 3; 53. The method furthermore comprises, in particular after said removing and second mounting, suspending (second suspending) the car 1; 51 with a hoisting roping 6; 6' from the hoisting machine 5; 5' mounted in said second position II via said cabin frame 3; 53 without said temporary pulley beam assembly 4, as illustrated in FIG. 4. The method furthermore comprises, in particular after performing said second suspending, moving (second moving) the elevator car 1; 51 in the hoistway 2 with the hoisting machine 5; 5' while it is in said second position II and the car 1; 51 is suspended via said cabin frame 3; 53 without said temporary pulley beam assembly 4. Said second moving is illustrated in FIG. 4 by arrow a2.

The hoisting machine 5; 5' mounted in said second position I is the same (i.e. hoisting machine 5) as or different (i.e. hoisting machine 5') than the hoisting machine 5 mounted in said first position I. In the first case, i.e. when it is the same, the advantage is that the same components can be used in said first and second moving. In the second case, i.e. when it is different, the advantage is that the components can be optimized for the construction phase and final use separately. Said hoisting roping 6; 6' with which the elevator car 1; 51 is suspended in said second suspending is the same as (i.e. roping 6) or different than (i.e. roping 6') the hoisting roping 6 with which the elevator car 1 is suspended in said first suspending. In the first case, i.e. when it is the same, the advantage is that the same components can be used in said first and second moving. In the second case, i.e. when it is different, the advantage is that the components can be optimized for the construction phase and final use separately.

Figure 2:
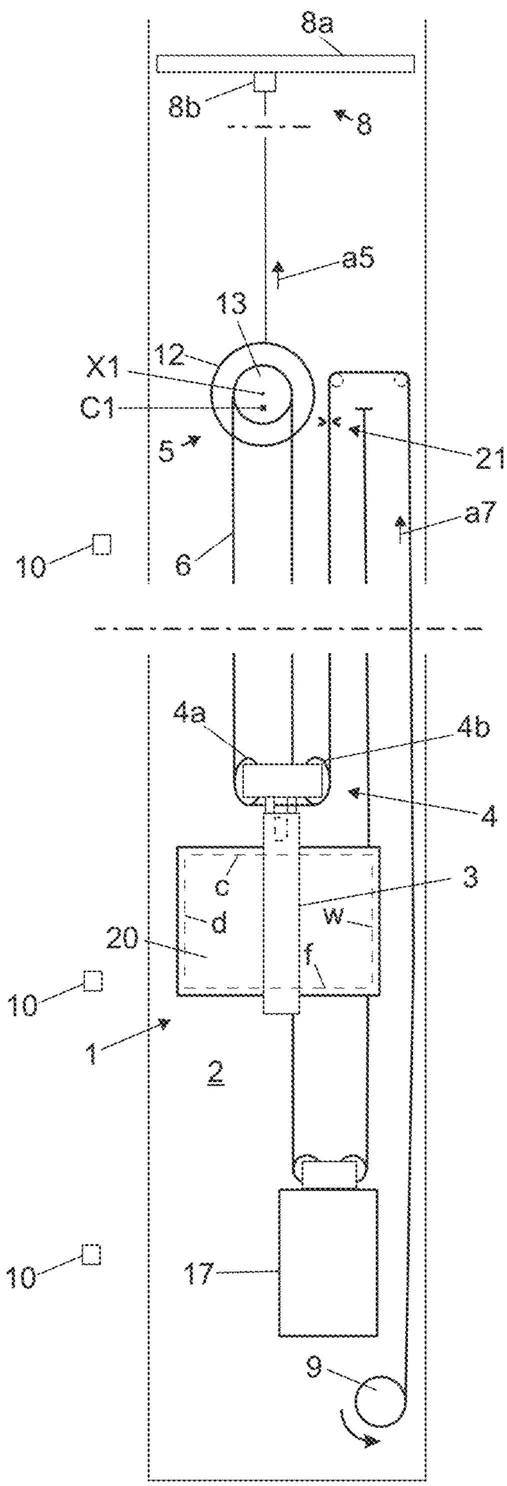
FIG. 2 illustrates an intermediate phase of the method where a hoisting is performed.
Figure 3:
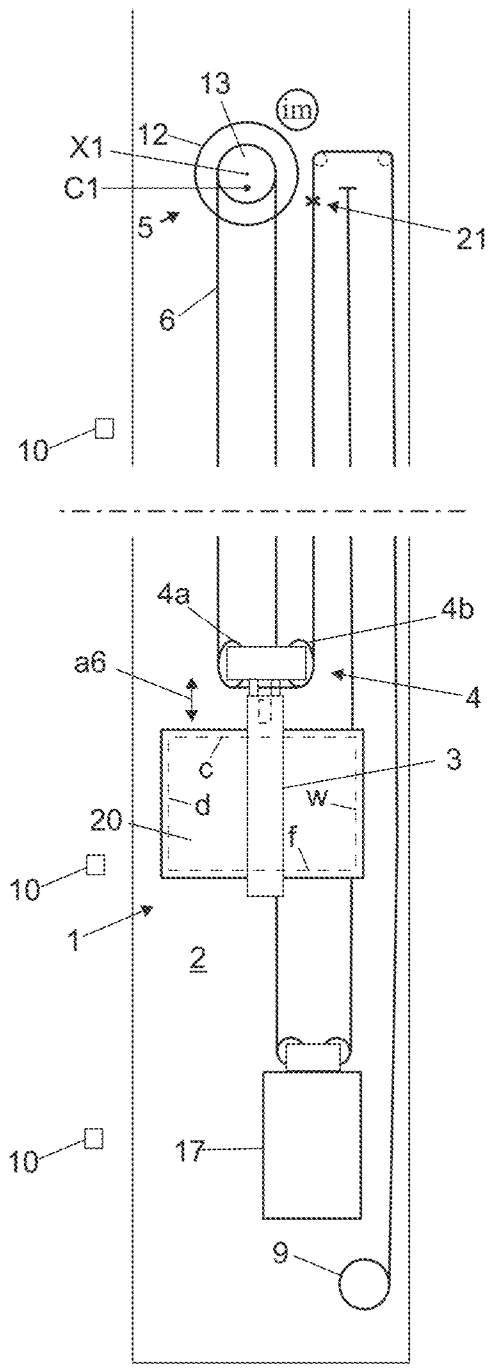
FIG. 3 illustrates an intermediate phase of the method where the hoisting machine is in an intermediate first position.

FIGS. 2 and 3 illustrate preferred, although not necessary intermediate phases of the method.

Use of the temporary pulley beam assembly 4 provides a way to separately optimize the layout of a construction time elevator arrangement A; A' where a hoisting machine 5 inside a hoistway 2 and the layout of the final elevator where a hoisting machine 5 is inside a machine room above the hoistway 2. Particularly, use of the temporary pulley beam assembly 4 provides a way to route the suspension roping 6 and position the hoisting machine 5 temporarily for the time of construction in a manner optimized for the construction time use. Yet, the route of the suspension roping 6 and the position of the hoisting machine 5 are easily and quickly changeable to be optimal for the final elevator use. Owing to the temporary pulley beam assembly 4, the changeover is simple and quick, which can be made so that the same cabin frame is used in said construction time elevator arrangement A; A' as well as in the final elevator.

As earlier above mentioned, use of the temporary pulley beam assembly 4 facilitates separate optimizing the construction time layout and final elevator layout. Said optimizing the layout is likely to require mounting the hoisting machine 5, 5' in second said position II in horizontal direction differently than in said first position I. In the following three chapters three such differences are described, which are all realized in the illustrated embodiments. However, such differences could be also be individually be provided into the layouts by aid of the temporary pulley beam assembly 4. Such differences involve a difference in position of rotation axes and/or a difference in vertical silhouettes and/or a difference in centres of gravity.

Figure 10:
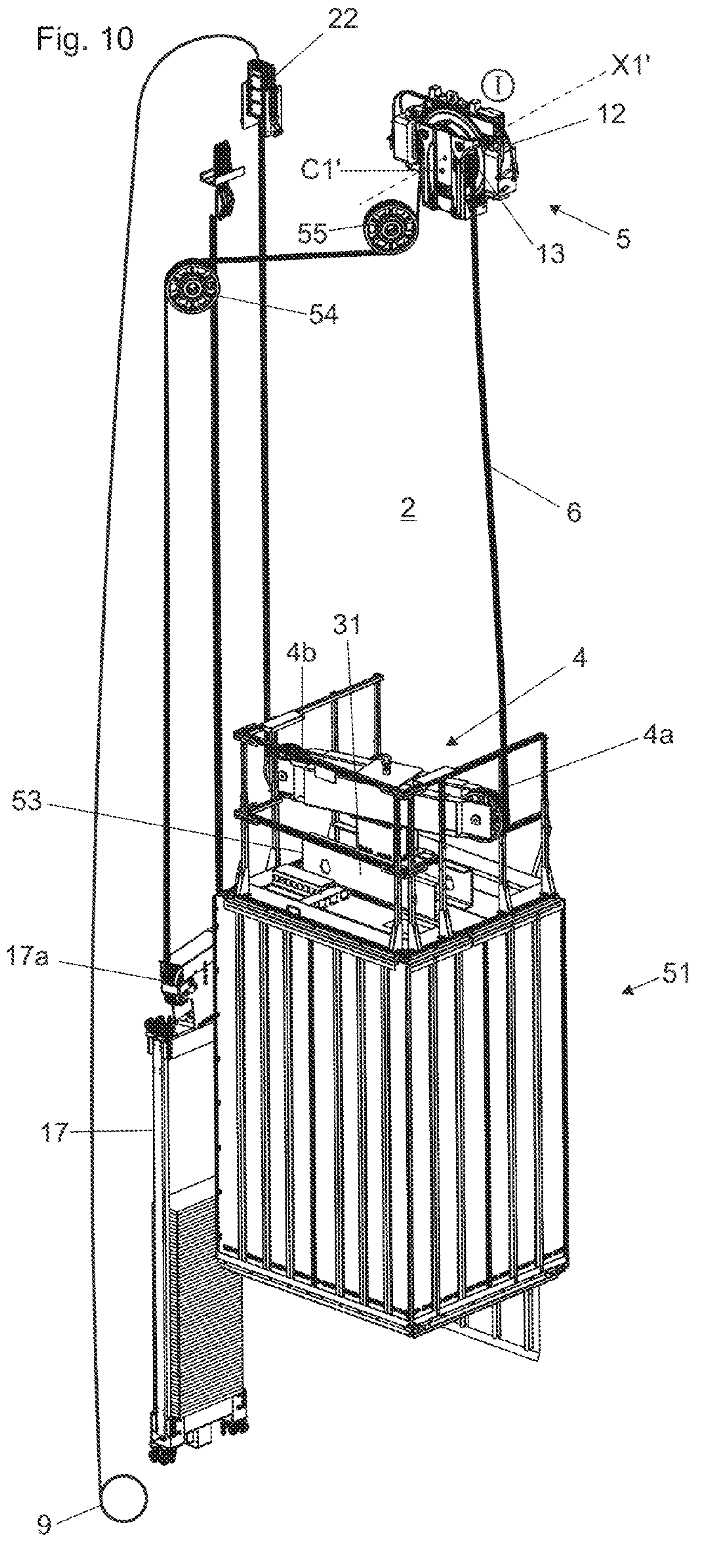
FIG. 10 illustrates partially the arrangement of FIG. 9.

As it can be seen in FIGS. 1 and 4, and FIGS. 10 and 4 respectively, the hoisting machine 5 mounted in the first position I comprises a drive wheel 13 for driving a roping 6 suspending the elevator car 1; 51, and the hoisting machine 5; 5' mounted in second position II comprises a drive wheel 13; 13' for driving a roping 6; 6' suspending the elevator car 1; 51, and the rotation axis X1; X1' of the hoisting machine mounted in the first position I and the rotation axis X2 of the hoisting machine 5; 5' mounted in the second position II are non-parallel.

As it can be seen in FIGS. 1 and 4, and FIGS. 10 and 4 respectively, the hoisting machine 5 mounted in the first position I comprises a drive wheel 13 for driving a roping 6 suspending the elevator car 1; 51, and the hoisting machine 5; 5' mounted in second position II comprises a drive wheel 13; 13' for driving a roping 6; 6' suspending the elevator car 1; 51, and the vertical silhouettes of the drive wheel 13 of the hoisting machine 5 mounted in first position I and the drive wheel 13; 13' of the hoisting machine 5; 5' mounted in the second position II do not coincide.

As it can be seen in FIGS. 1 and 4, and FIGS. 10 and 4 respectively, the centre of gravity C1; C1' of the hoisting machine 5 mounted in first position I, and the centre of gravity C2 of the hoisting machine 5 mounted in the first position I are horizontally displaced, in particular more than 20 cm.

Figure 8:
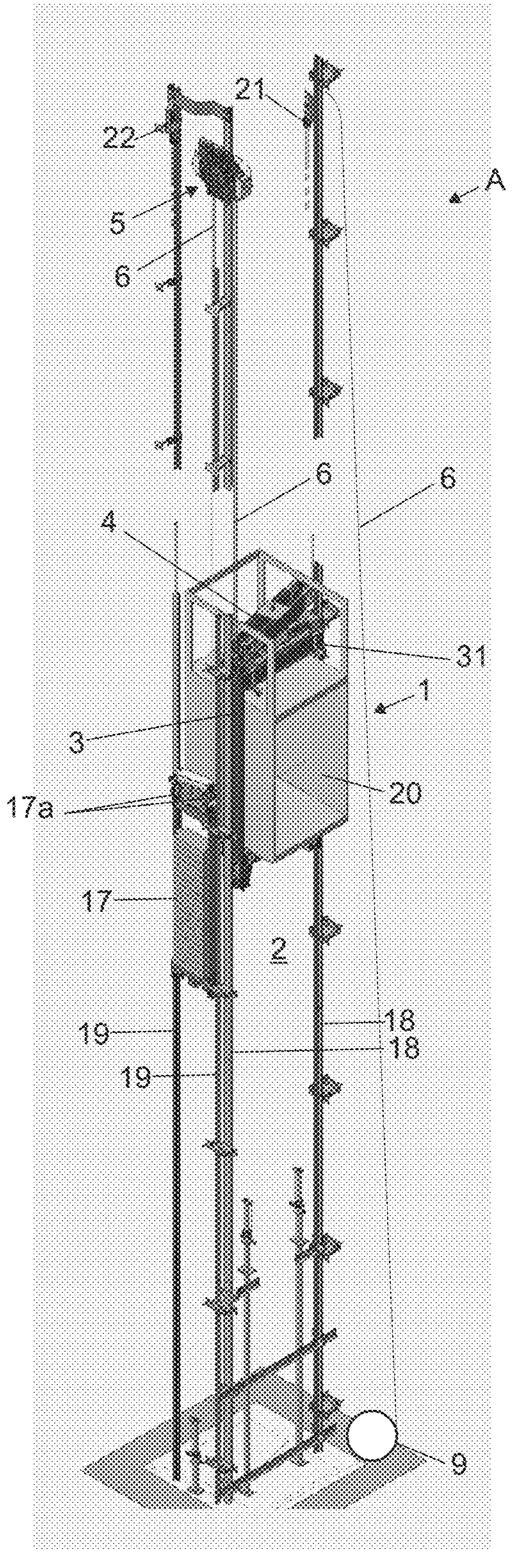
FIG. 8 illustrates preferred details of the arrangement of FIG. 1.

As illustrated in FIG. 8 showing preferable details of the construction time elevator arrangement A of the first kind, the layout of a construction time elevator arrangement A is particularly optimizable such that the hoisting roping 6 can pass to a rope supply storage 9, and the hoisting machine 5 can be mounted on a vertically oriented guide rail 18 mounted in the hoistway 2.

As illustrated in FIG. 9 showing preferable details of the construction time elevator arrangement A' of the second kind, the layout of a construction time elevator arrangement A' is particularly optimizable such that the hoisting roping 6 can pass to a rope supply storage 9, and the hoisting machine 5 and other components affecting the route of the roping 6 can be mounted on a movable platform 56 of a temporary machine room 50 movable vertically in the hoistway 2 such that the temporary machine room 50 balance is relatively central when the car 51 hangs from it.

In the following preferred aspects of the temporary pulley beam assembly 4 have been described.

In the preferred embodiments, the cabin frame 3; 53 comprises a horizontal beam 31, and the temporary pulley beam assembly 4 is mounted on the horizontal beam 31 of the cabin frame 3; 53 such that the temporary pulley beam assembly 4 is at an angle relative to the horizontal beam 31 of the cabin frame 3; 53 (i.e. they are non-parallel) during said first moving. This is visible in FIGS. 5 and 8-10.

In the preferred embodiments, the beam structure 40-42 is elongated having a first end E1 and a second end E2, and the temporary pulley beam assembly 4 comprises at said first end a first pulley 4*a* and at said second end a second pulley 4*b*, and the first suspending comprises arranging the hoisting roping 6 to pass around said first pulley 4*a* and said second pulley 4*b*. This is visible in FIGS. 1-3, 5 and 8-10.

Said second suspending is preferably such that it comprises arranging a hoisting roping 6; 6' to pass around one or more pulleys 32, 33, preferably a third pulley 32 and a fourth pulley 33, mounted on the cabin frame 3; 53, as illustrated in FIGS. 4 and 6. It is however possible also to change in said second suspending the suspension ratio, in which case said second suspending could alternatively be such that it would comprise fixing an end of a hoisting roping 6; 6', i.e. ends of individual ropes thereof, to the cabin frame 3; 53.

Preferably, the horizontal distance between said first and second pulley 4*a*, 4*b* is adjustable. In this case, the method comprises before said first suspending adjusting the horizontal distance between said first and second pulley 4*a*, 4*b*. Adjustability of the distance is shown by arrow a3 in FIG. 5.

Preferably, the cabin frame 3; 53 comprises a horizontal beam 31, and the temporary pulley beam assembly 4 is detachably mounted on the horizontal beam 31 of the cabin frame 3; 53, and the angle between the beam body 40 of the temporary pulley beam assembly 4 and the cabin frame 3, in particular the horizontal beam 31 of the cabin frame 3, is adjustable. In this case, the method comprises before said first suspending adjusting said angle. Adjustability of the angle is shown by arrow a4 in FIG. 5.

For facilitating detachability, the temporary pulley beam assembly 4 detachably mounted on the cabin frame 3; 53 is preferably fixed to the cabin frame 3; 53 with releasable fixing means 35, as illustrated in FIG. 5. The releasable fixing means 35 may comprise one or more screwable fixing members, such as one or more bolts, for example. Preferably then, the detaching the temporary pulley beam assembly 4 from the cabin frame 3; 53 comprises releasing the releasable fixing means 35.

Figure 11:
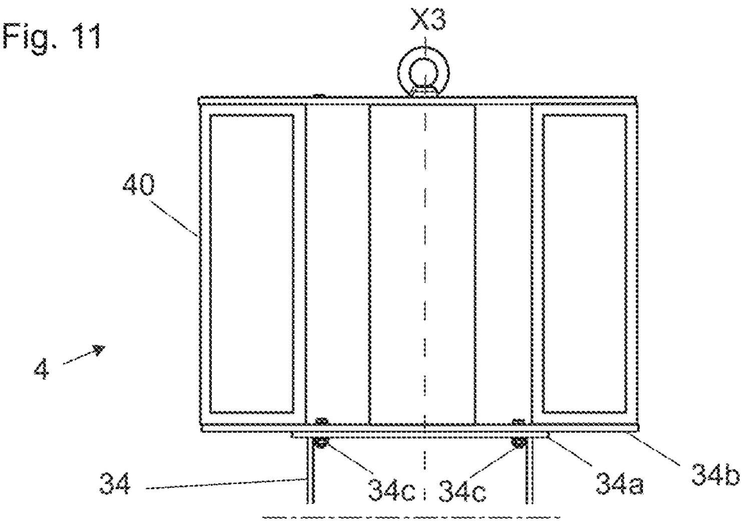
FIG. 11 illustrates preferred details of a mounting structure of FIG. 5.
Figure 12:
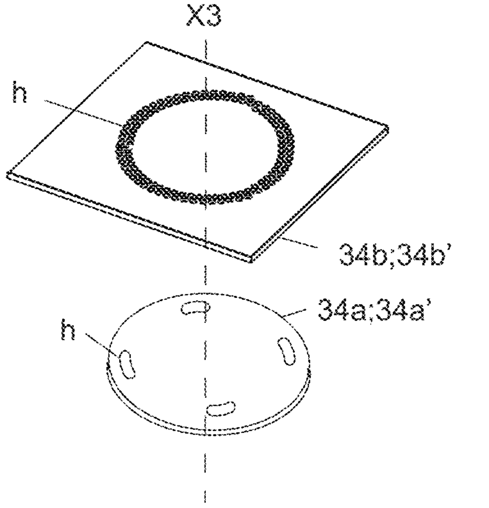
FIG. 12 illustrates preferred details of pivotable and lockable mounting means of a mounting structure of FIG. 5 or FIG. 14.

For allowing easy adjustment of the angle between the beam body 40 of the temporary pulley beam assembly 4 and the cabin frame 3, the mounting structure 34 comprises pivotable and lockable mounting means 34*a*, 34*b*, 34*c* between the beam body 40 and the horizontal beam 31 of the cabin frame 3; 53. Preferred details of the pivotable and lockable mounting means are illustrated in FIGS. 11-12. In the preferred embodiments of FIGS. 11-12, the pivotable and lockable mounting means 34*a*, 34*b*, 34*c* comprise a lower support member 34*a*, in particular a support plate member, and an upper support member 34*b* in particular a support plate member. The support members 34*a*, 34*b* can be pivoted relative to each other around a vertical axis X3 into multiple different relative positions when the pivotable and lockable mounting means 34*a*, 34*b*, 34*c* are in unlocked state. The support members 34*a*, 34*b* are placed on top of each other. One of the support members 34*a*, 34*b* carries the beam body 40 and the other is in fixed connection with the frame 3; 53 of the car 1, such as the horizontal beam 31 thereof. Each support member 34*a*, 34*b* comprises plurality holes positioned such that the support members 34*a*, 34*b* can be pivoted relative to each other around a vertical axis X3 into multiple different relative positions such that holes of the support members 34*a*, 34*b* coincide, and can be locked together by inserting a locking member such as a bolt into coinciding holes. The pivotable and lockable mounting means 34*a*, 34*b*, 34*c* also comprise a locking member 34*c*, such as a bolt insertable into coinciding holes of the support members 34*a*, 34*b*.

The angle between the beam body 40 of the temporary pulley beam assembly 4 and the horizontal beam 31 of the cabin frame 3 is adjustable particularly by pivoting the beam body 40 of the temporary pulley beam assembly 4 relative to the horizontal beam 31 of the cabin frame 3 around a vertical axis X3. The pivotable and lockable mounting means 34*a*, 34*b*, 34*c* are during adjusting of the angle in unlocked state, and after said adjusting the angle, the pivotable and lockable mounting means 34*a*, 34*b*, 34*c* are shifted into locked state.

The horizontal beam 31 of the cabin frame 3; 53 provides an advantageous base for one or more pulleys 32, 33, around which the hoisting roping 6, 6' is arranged to pass in the second suspending. The one or more pulleys 32, 33 can be already present at the time of said first moving (as illustrated in FIGS. 1-5 by broken lines and in FIG. 8), whereby the car 1 can be assembled already at an early stage relatively well ready for use in the final elevator. In this case, around said one or more pulleys 32, 33 the hoisting roping, nor any other roping does not yet pass at the time of said first moving. This early presence of the pulleys 32, 33 is however not necessary.

Said first moving is preferably such that it comprises controlling by an elevator control 11 the hoisting machine 5 mounted in the first position I, in particular rotation of a motor 12 of the hoisting machine 5 connected to a drive wheel 13 of the hoisting machine 5 around which drive wheel 13 the roping 6 passes, in response to signals received from one or more user interfaces 10, while the hoisting machine 5 is mounted in the first position I. Each said user interface 10 is preferably connected to the elevator control 11 wirelessly or with wired connection, as illustrated in FIG. 7. The elevator control 11 on the other hand is wirelessly or with wired connection connected with the hoisting machine 5.

Said second moving is preferably such that it comprises controlling by an elevator control 11 the hoisting machine 5; 5' mounted in the second position I, in particular rotation of a motor 12 of the hoisting machine 5 connected to a drive wheel 13; 13' of the hoisting machine 5; 5' around which drive wheel 13; 13' the roping 6; 6' passes, in response to signals received from one or more user interfaces 10, while the hoisting machine 5; 5' is mounted in the second position II. Each said user interface 10 is preferably connected to the elevator control 11 wirelessly or with wired connection, as illustrated in FIG. 7. The elevator control 11 on the other hand is wirelessly or with wired connection connected with the hoisting machine 5, 5'.

Each said user interface 10 mentioned above can be in the form of an operating panel such as a push button panel or a touch screen, for instance.

As mentioned, the method may comprise intermediate phases illustrated in FIGS. 2 and 3, which intermediate phases concern a so called jump-sequence. The intermediate phases described referring to FIGS. 2 and 3 may also be realized in the method of the second kind in a corresponding manner. When the method comprises this kind of intermediate phases, the method comprises between said first moving and said second mounting, at least one sequence (jump sequence) comprising hoisting the hoisting machine 5 higher in the hoistway to an intermediate position im, which intermediate position im is at a vertical level which is vertically between said first and second position I, II; and thereafter mounting the hoisting machine 5 in said intermediate position im; and following said sequence (jump sequence), moving (intermediate moving) the elevator car 1; 51 in the hoistway 2 with the hoisting machine 5 while it is in said intermediate position im and suspended by the roping 6 via said temporary pulley beam assembly 4.

Said hoisting the hoisting machine 5 higher in the hoistway to an intermediate position im is illustrated by arrow a5 in FIG. 2. The hoisting is performed with a hoisting arrangement 8, which preferably comprises a support structure **8*a* mounted in the hoistway 2, and a hoist 8*b* supported by the support structure 8*a*. The hoisting machine 5 mounted to the intermediate position im is illustrated in FIG. 3. Said intermediate moving is illustrated by arrow a6 in FIG. 3**.

The method preferably comprises during said jump sequence supplying an additional length of said hoisting roping 6 from a rope supply storage 9 to which the hoisting roping 6 passes. Said preferably supplying comprises moving an additional length of said hoisting roping 6 through an openable rope clamp 21 from the rope supply storage 9 e.g. by pulling hoisting roping 6 said pulling preferably being produced at least partly by hoisting of the hoisting machine 5. The supplying is illustrated particularly in FIG. 2 by arrows a7. The supplying would preferably work in a similar manner in the embodiment of FIG. 9. The clamp 21 is in opened state when said supplying is performed. During the first moving and each intermediate moving, the clamp 21 is closed state. Hoisting of the clamp 21 and fixing 22 are not shown in Figures, but the clamp 21 as well as the fixing 22 can be hoisted simultaneously together with the hoisting machine 5 in said hoisting or alternatively separately from each other. After hoisting of the clamp 21 and fixing 22 they can be mounted to a higher position.

In the preferred embodiments illustrated in FIGS. 1-3 and 8, in said first mounting and/or said intermediate mounting, the hoisting machine 5 is mounted on a vertically oriented guide rail 18 for guiding the elevator car 1. In this kind of case, which can also be referred to as a case serving initially in a machineroomless form, use of the temporary pulley beam assembly 4 is particularly preferable because the special mounting place of the hoisting machine 5 sets very strict requirements for the route of the hoisting roping, and the final elevator is likely not optimized with such a route. Owing to the temporary pulley beam assembly 4, the car 1 can be made structurally ready to be suspended by small amount of steps with a hoisting roping 6, 6' passing a different route. For example, the hoisting roping 6, 6' of the final elevator can be simply guided by pulleys 32, 33 of the car 1 to pass across the hoistway 2 in direction which is parallel to a hoistway wall and/or parallel to plane on which guide rails 18 for guiding the elevator car 1 have been positioned on opposite sides of the car 1. Mounting on a guide rail provides a low cost solution which is quick to implement and suits well also for relatively low height projects. At least some of the advantages would be achieved also if the hoisting machine 5 would be mounted in a machineroomless manner on some other structure, such as on some other vertically oriented guide rail 19, e.g. a vertically oriented guide rail 19 for guiding a counterweight 17.

An embodiment of a construction-time elevator arrangement A of a first kind according to the invention has been illustrated in FIG. 1 and an embodiment of a second kind of a construction-time elevator arrangement A' according to the invention has been illustrated in FIG. 9, as already described above.

The construction-time elevator arrangement A; A' of FIG. 1 and FIG. 9, respectively, particularly comprises an elevator car 1; 51 in a hoistway 2, said elevator car 1; 51 comprising a cabin frame 3; 53, and a temporary pulley beam assembly 4 detachably mounted on the frame 3. The cabin frame 3; 53 carries panels delimiting a cabin interior 20, said panels preferably including wall panels w, floor panel f, ceiling panel c. The cabin frame 3; 53 preferably moreover carries one or more door panels d (not shown in all Figures) delimiting said cabin interior 20.

The construction-time elevator arrangement A; A' moreover comprises a hoisting machine 5 mounted in a first position I which first position I is at a first vertical level in the hoistway 2 and a hoisting roping 6 wherein the elevator car 1; 51 is suspended with the hoisting roping 6 from the hoisting machine 5 via said temporary pulley beam assembly 4.

The elevator car 1; 51 is movable in the hoistway 2 with the hoisting machine 5 while it is in said first position I and suspended by the roping 6 via said temporary pulley beam assembly 4.

The arrangement A; A' comprises an elevator control 11 configured to control the hoisting machine 5, in particular rotation of a motor 12 of the hoisting machine 5 connected to a drive wheel 13 of the hoisting machine 5 around which drive wheel 13 the roping 6 passes, in response to signals received from one or more user interfaces 10, while the hoisting machine 5 is mounted in the first position I. Each said user interface 10 is preferably connected to the elevator control 11 wirelessly or with wired connection, as illustrated in FIG. 7. The elevator control 11 on the other hand is wirelessly or with wired connection connected with the hoisting machine 5.

The construction-time elevator arrangement A; A' moreover comprises a rope supply storage 9 to which the hoisting roping 6 passes. This facilitates performing a jump sequence as described elsewhere in the application. The construction-time elevator arrangements A; A' of FIGS. 1 and 9 are more specifically such that they comprise a car 1 and counterweight 17, and the hoisting roping 6 passes from a fixing 22 to one of said car 1 and counterweight 17, under one or more pulleys **4*a*, 4*b* mounted thereon, and therefrom to a drive wheel 13 of the hoisting machine 5, over it and therefrom to the other of said car 1 and counterweight 17, under one or more pulleys 17*a* mounted thereon and therefrom to an openable rope clamp 21 and therefrom to the rope supply storage 9. In FIGS. 1 and 9, said one of said car 1 and counterweight 17, is the counterweight and said other of said car 1 and counterweight 17 is the car 1**, but this could alternatively be vice versa.

Said arrangement A: A' preferably comprises a hoisting arrangement 8 for hoisting the hoisting machine 5 higher in the hoistway 2, as illustrated in FIG. 1.

In case of arrangement A' such a hoisting arrangement is not shown but this is preferably implemented such that there is a corresponding hoisting arrangement 8 as in FIG. 1 above the temporary machine room 50 on which the hoisting machine 5 is mounted, for hoisting the temporary machine room 50 and the hoisting machine 5 and other components such as 21 and 22 together with it. Alternatively, the temporary machine room 50 can itself comprise a hoisting arrangement for hoisting the temporary machine room 50 and the hoisting machine 5 and other components such as 21 and 22 together with it, in which case the hoisting arrangement can comprise a climbing means for example actuatable to climb along the hoistway or structures mounted therein.

Said arrangement A: A' preferably moreover comprises a machine room 7 located above the hoistway 2, which may be still under construction. The machine room 7 preferably comprises a floor 14 comprising one or more holes 15 extending through it in vertical direction. The machine room 7 preferably comprises a mounting pedestal 16 on which a hoisting machine 5; 5' is mountable in a second position II.

In said arrangement A: A', the temporary pulley beam assembly 4 is structurally preferably moreover such that it the beam structure 40-42 thereof is elongated having a first end E1 and a second end E2, and the temporary pulley beam assembly 4 comprises at said first end a first pulley 4*a* and at said second end a second pulley 4*b*, and the hoisting roping 6 passes around said first pulley 4*a* and said second pulley 4*b*.

The cabin frame 3; 53 comprises a horizontal beam 31, and the temporary pulley beam assembly 4 is mounted on the horizontal beam 31 of the cabin frame 3; 53. In the embodiments of FIGS. 1-6, 8-10, the temporary pulley beam assembly 4 is above the cabin interior of the car. In these embodiments, the horizontal beam 31 on which the temporary pulley beam assembly 4 is mounted, extends above the cabin interior 20 of the car 1; 51. The temporary pulley beam assembly 4 is mounted on the horizontal beam 31 of the cabin frame 3; 53 above it. The beam body 40 of the temporary pulley beam assembly 4 is at an angle relative to the horizontal beam 31 of the cabin frame 3; 53.

In a preferred embodiment, the temporary pulley beam assembly 4 preferably comprises a mounting structure 34. The temporary pulley beam assembly 4 is detachably mounted on the cabin frame 3; 53 in particular on a horizontal beam 31 thereof via a mounting structure 34. As illustrated in FIG. 6, the mounting structure 34 comprises a pedestal positioned vertically between a beam body 40 of the temporary pulley beam assembly 4 and the horizontal beam 31 and, in particular such that the horizontal beam 31 and the beam body 40 are a distance, preferably more than 10 cm high, apart. This facilitates that the temporary pulley beam assembly 4 and the horizontal beam 31 can be simply arranged at an angle without the hoisting roping 6 contacting in use a beam 31. The pedestal 34 preferably comprises a opening extending through it horizontally and in direction parallel with the longitudinal direction of the beam body 40. The first suspending then comprises arranging the hoisting roping 6 to pass through said opening 0. The opening thus allows passage of the roping 6 between the pulleys 4*a*, 4*b* unblocked by the pedestal 34. The mounting structure is preferably detachably attached on the horizontal beam 31 of the cabin frame 3; 53. For enabling this, the mounting structure 34 is preferably fixed to the horizontal beam of the cabin frame with the releasable fixing means 35 as earlier described referring to FIG. 5.

As earlier described, referring to FIG. 5, the horizontal distance between said first and second pulley 4*a*, 4*b* is preferably adjustable. This is implemented such that the beam structure 40-42 of the temporary pulley beam assembly 4 comprises a beam body 40 and a first end member 41 on which the first pulley 4*a* is mounted, and a second end member 42 on which the second pulley 4*b* is mounted. The first end member 41 and the second end member 42 are connected to the beam body 40 telescopically movably, and the first end member 41 and the second end member 42 are lockable to be immovable relative to the beam body 40. For this purpose, there is preferably a locking means (not showed) comprised in the temporary pulley beam assembly 4, which locking means lock the first end member 41 immovably to the beam body 40 and the second end member 42 immovably to the beam body 40. These locking means may comprise one or more bolts, and plurality of holes in the beam body 40 and each of the end members 41, 42 through which holes a bolt is to be placed. The holes are positioned such that the parts 40, 41; 40, 42 to be locked can be positioned in multiple different relative positions such that hole of the parts 40, 41; 40, 42 to be locked coincide, for example.

In the embodiment of FIG. 1, in the arrangement A the hoisting machine 5 is mounted in said first position I on a vertically oriented guide rail 18 for guiding the elevator car 1. Mounting on a guide rail provides a low cost solution which is quick to implement and suits well also for relatively low height projects. At least some of the advantages would be achieved also if the hoisting machine 5 would be mounted in a machineroomless manner on some other structure, such as on some other vertically oriented guide rail 19, e.g. a vertically oriented guide rail 19 for guiding a counterweight 17.

In the embodiment of FIG. 9, in the arrangement A' the hoisting machine 5 is mounted in said first position I via a movable platform 56. The movable platform 56 is preferably comprised in a temporary machine room 50 movable vertically in the hoistway 2. In the embodiment, of FIG. 9, the hoisting roping 6 is guided to pass from said one of said car 1 and counterweight 17 to the drive wheel 13 by aid of pulleys 54, 55 also referred to as fifth and sixth pulley mounted on the temporary machine room 50. The fifth and sixth pulley 54, 55 are visible in FIG. 10 where bearing structures of the temporary machine room 50 are not shown. Particularly, the hoisting roping 6 is guided to pass from said one of said car 1 and counterweight 17 to a fifth pulley 54, over it and to a sixth pulley 55, under it, and therefrom to the drive wheel 13, and over it. This provides a lateral shift in route of the hoisting roping 6 allowing increased freedom in selecting in horizontal direction a position for the hoisting machine 5, which facilitates balance of the temporary machine room 50.

Figure 13:
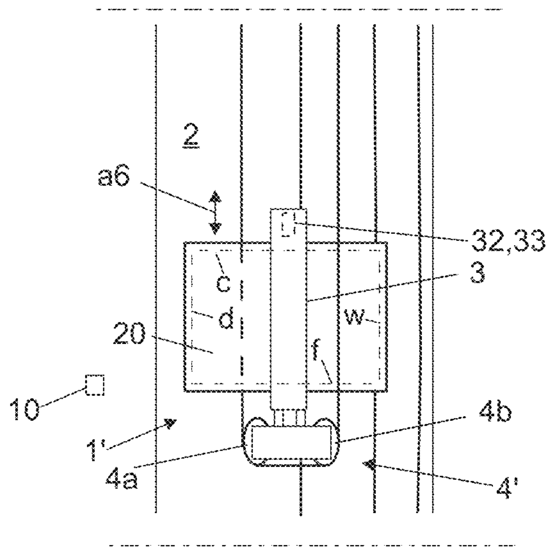
FIG. 13 illustrates an embodiment where the temporary pulley beam assembly is below the cabin interior of the car.

FIGS. 1-3 illustrate steps of a method where the temporary pulley beam assembly 4 is above the cabin interior of the car 1. However, alternatively the temporary pulley beam assembly can be in these steps below the cabin interior of the car 1. FIG. 13 illustrates how the temporary pulley beam assembly can be in the arrangement and steps of FIGS. 1-3 below the cabin interior of the car 1. Correspondingly, the arrangement and method of FIGS. 9-10 could be implemented such that the pulley beam assembly is below the cabin interior of the car 1.

Figure 14:
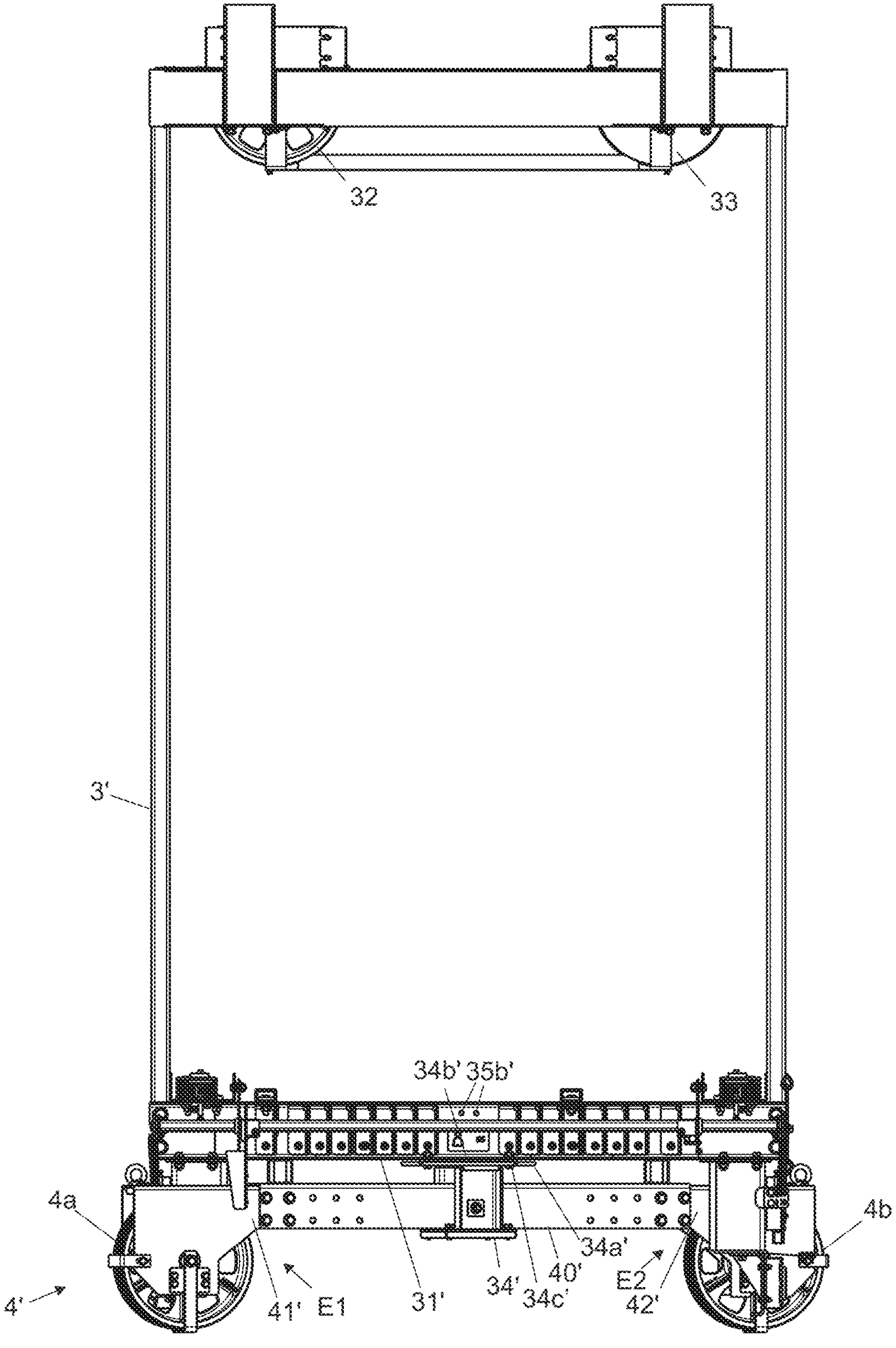
FIGS. 14 and 15 illustrate preferred further detail of the embodiment of FIG. 13.
Figure 15:
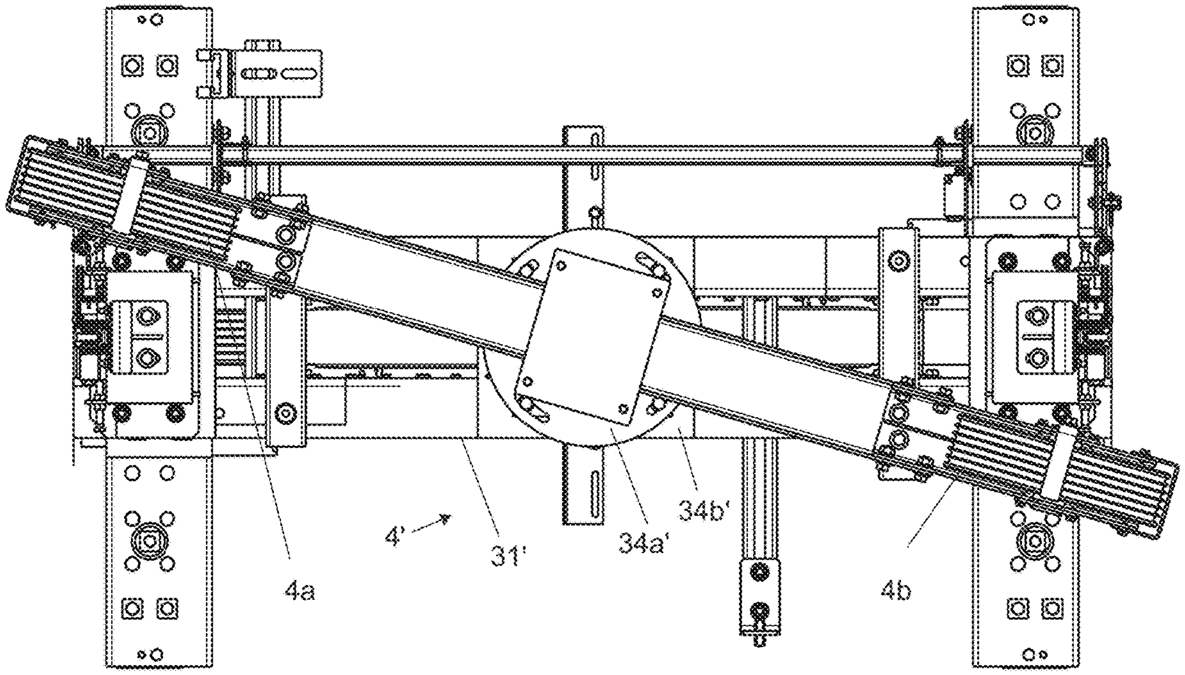

In FIG. 13, reference numeral 4' has been used of the temporary pulley beam assembly and reference numeral 1' of the car since in the car 1' showed in FIG. 13 is differently positioned. Moreover, reference numerals of 34'; 34*a*'-34*c*' has been used of the mounting structure and its components, and reference numerals of 40'-42' have been used of the parts of the beam structure and reference numeral of 3' has been used of the car frame and reference numeral 35' has been used of releasable fixing means. Each of these parts 1', 3', 34', 34*a*'-34*c*', 35', 40'-42' preferably has all the abilities as corresponding parts 1, 3, 34, 34*a*-34*c*, 35, 40-42 described referring to the embodiment where the temporary pulley beam assembly 4 is above the cabin interior of the car 1. FIGS. 14 and 15 illustrate preferred details for implementing positioning of the temporary pulley beam assembly 4' below the cabin interior of the car 1'. As illustrated, the temporary pulley beam assembly 4' is mounted detachably on a horizontal beam 31' of the cabin frame 3', which horizontal beam 31' extends below the cabin interior of the car 1'. Then preferably, the temporary pulley beam assembly 4' is mounted detachably on the horizontal beam 31' of the cabin frame below the horizontal beam 31'.

Generally, each said hoisting roping mentioned in the application can comprise one or more ropes.

As described referring to preferred embodiments, it is preferable that the temporary pulley beam assembly is detachably mounted on a horizontal beam of the cabin frame via a mounting structure detachably attached on the cabin frame, preferably on a horizontal beam thereof. Use of a mounting structure is however not necessary since, the temporary pulley beam assembly could alternatively be detachably mounted directly on the cabin frame such as on a horizontal beam thereof. This could then be realized by releasable fixing means. The releasable fixing means may comprise one or more screwable fixing members, such as one or more bolts, for example.

Generally, in the car 1; 51; 1' the number of the beam bodies 40; 40' is preferably at least one since the structure could be implemented as one-beam structure by omitting the other beam body 40; 40' showed in Figures. In the preferred embodiments, in the car 1; 51; 1' the number of the beam bodies 40; 40' is two and they are side by side, which results in a rigid double beam structure.

Generally, in the car 1; 51; 1' the number of the beams 31; 31' is preferably at least one since the structure could be implemented as one-beam structure by omitting the other of the beams 31; 31' showed in Figures. In the preferred embodiments, in the car 1; 51; 1' the number of the beams 31; 31' is two and they are side by side, which results in a rigid double beam structure.

It is to be understood that the above description and the accompanying Figures are only intended to teach the best way known to the inventors to make and use the invention. It will be apparent to a person skilled in the art that the inventive concept can be implemented in various ways. The above-described embodiments of the invention may thus be modified or varied, without departing from the invention, as appreciated by those skilled in the art in light of the above teachings. It is therefore to be understood that the invention and its embodiments are not limited to the examples described above but may vary within the scope of the claims.

The invention claimed is:

1. A method of constructing an elevator comprising:
- providing an elevator car in a hoistway, said elevator car comprising a cabin frame, and a temporary pulley beam assembly detachably mounted on the cabin frame;
- mounting, as a first mounting, a hoisting machine in a first position at a first vertical level in the hoistway;
- suspending, as a first suspending, the elevator car with a hoisting roping from the hoisting machine via the temporary pulley beam assembly;
- moving, as a first moving, the elevator car in the hoistway with the hoisting machine in the first position and suspended by the roping via the temporary pulley beam assembly;
- mounting, as a second mounting, the hoisting machine in a second position at a second higher vertical level than the first position inside a machine room located above the hoistway;
- removing the temporary pulley beam assembly from the elevator car, comprising detaching the temporary pulley beam assembly from the cabin frame;
- suspending, as a second suspending, the elevator car with the hoisting roping from the hoisting machine mounted in the second position via the cabin frame without the temporary pulley beam assembly;
- moving, as a second moving, the elevator car in the hoistway with the hoisting machine in the second position and the elevator car being suspended via the cabin frame without the temporary pulley beam assembly.

2. A method according to claim 1, wherein
- the hoisting machine comprises a drive wheel for driving a roping suspending the elevator car, and
- a rotation axis of the hoisting machine mounted in the first position and a rotation axis of the hoisting machine mounted in the second position are non-parallel.

3. A method according to claim 1, wherein a centre of gravity of the hoisting machine mounted in first position and a centre of gravity of the hoisting machine mounted in the second position are horizontally displaced.

4. A method according to claim 1, wherein
- the temporary pulley beam assembly comprises a beam structure, a first pulley, and a second pulley,
- the first suspending comprises arranging the hoisting roping to pass around the first and second pulleys,
- the beam structure is elongated having a first end and a second end,
- the first pully is at first end, and
- the second pully is at the second end.

5. A method according to claim 4, wherein
- the horizontal distance between said first and second pulley is adjustable, and
- the method further comprises, before the first suspending, adjusting the horizontal distance between said first and second pulley, the adjusting being performed at a time the temporary pulley beam assembly is inside the hoistway.

6. A method according to claim 1, wherein the second suspending comprises arranging the hoisting roping to pass around one or more pulleys, the one or more pulleys mounted on the cabin frame.

7. A method according to claim 1, wherein at the time of the first moving the car comprises one or more pulleys, the one or more pulleys mounted on the cabin frame, the hoisting rope not passing around the one or more pulleys.

8. A method according to claim 1, wherein
- the method comprises, between the first moving and second mounting,
  - at least one sequence, as a jump sequence, comprising
    - hoisting the hoisting machine higher in the hoistway to an intermediate position vertically between said first and second position;
    - mounting the hoisting machine in the intermediate position; and
  - moving, as an intermediate moving, after the at least one sequence, the elevator car in the hoistway with the hoisting machine in the intermediate position and suspended by the roping via the temporary pulley beam; or
- the hoisting machine, at at least the first mounting and the intermediate mounting, is mounted on a vertically oriented guide rail for guiding the elevator car and/or a vertically oriented guide rail for guiding counterweight, or via a movable platform.

* * * * *